(12) United States Patent
Heuer et al.

(10) Patent No.: US 6,587,229 B1
(45) Date of Patent: *Jul. 1, 2003

(54) METHOD AND APPARATUS FOR SCANNING MASTERS

(75) Inventors: Axel Heuer, Fahren (DE); Holger Suhr, Kiel (DE)

(73) Assignee: Heidelberger Druckmaschinen Aktiengesellschaft, Heidelberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/405,248

(22) Filed: Sep. 24, 1999

(30) Foreign Application Priority Data

Sep. 30, 1998 (DE) ......................... 198 44 777
Aug. 4, 1999 (DE) ......................... 199 36 623

(51) Int. Cl.[7] ............... H04N 1/04; H04N 1/38; H04N 1/00; G01N 21/00; G01N 21/49
(52) U.S. Cl. ............... 358/493; 358/484; 358/475; 358/464; 358/406; 356/239; 250/574
(58) Field of Search ............... 358/475, 464, 358/406, 493, 484; 250/574; 356/239

(56) References Cited

U.S. PATENT DOCUMENTS

| 3,872,248 A | * | 3/1975 | Winters | 358/472 |
| 4,568,984 A | * | 2/1986 | Juergensen et al. | 358/484 |
| 4,742,401 A | * | 5/1988 | Andree et al. | 358/493 |
| 4,897,737 A | * | 1/1990 | Shalev | 358/489 |
| 5,929,435 A | * | 7/1999 | Han | 250/234 |
| 6,028,681 A | * | 2/2000 | Gray et al. | 358/475 |

FOREIGN PATENT DOCUMENTS

| DE | 34 06 629 | 9/1984 |
| DE | 35 09 228 | 6/1991 |
| DE | 44 27 850 | 12/1998 |
| JP | 8 248350 | 9/1996 |

* cited by examiner

Primary Examiner—Edward Coles
Assistant Examiner—Houshang Safaipour
(74) Attorney, Agent, or Firm—Schiff Hardin & Waite

(57) ABSTRACT

In a method and an apparatus for point-by-point and line-by-line scanning of a master chucked on a scanner drum, for pixel-by-pixel illumination of the master, a light spot is generated in a light conductor and is imaged onto the master as illumination spot. The light conductor is arranged displaceable with an actuating drive for the purpose of modifying the imaging scale of the illumination spot. For setting the illumination, the luminance of the illumination spot is measured with the opto-electronic scanner element. In a computer, control signals for the actuating drive are generated dependent on the measured luminance. For setting the optimum illumination of the master, the imaging scale of the illumination spot is modified such by displacing the light conductor that the measured luminance of the illumination spot is maximum.

22 Claims, 3 Drawing Sheets

METHOD AND APPARATUS FOR SCANNING MASTERS

BACKGROUND OF THE INVENTION

The invention is in the field of electronic reproduction technology and is directed to a method and to an apparatus for pixel-by-pixel and line-by-line, opto-electronic scanning of masters chucked on a scanner drum. Such a drum scanner device, referred to below as a drum scanner, can be designed for scanning black-and-white or chromatic masters in reflected light and/or transmitted light.

A drum scanner for scanning transparency masters is composed, for example, of a rotating, transparent scanner drum on which a transparency master to be scanned is chucked, of a light source for the pixel-by-pixel illumination of the transparency master and of a scanner element having a scanner objective, a scanner diaphragm and an opto-electronic transducer for converting the scan light the transparency master allows to pass into an image signal, which represents the luminance values of the scanned picture elements.

The light required for the pixel-by-pixel illumination of the transparency master is transported, for example, from a light source located outside the scanner drum through a light conductor into the hollow-cylindrical interior of the scanner drum, and is imaged thereat onto the transparency master as an illumination spot with a matching objective and a deflection mirror. The scan light modulated with the image content of the transparency master proceeds through the scanner objective into the scanner element located outside the scanner drum and is converted thereat into an image signal by opto-electronic conversion.

The scanner element on the one hand and the optical elements on the other hand are respectively secured to an arm of a U-shaped feed support, whereby the arm carrying the optical elements projects into the scanner drum at the end face.

For planar scanning of the transparency master, the feed support moves in the axial direction of the rotating scanner drum.

In order to be able to scan originals having different formats, the scope of a drum scanner usually includes scanner drums with different diameters that are chucked in the drum scanner dependent on the format of the master to be scanned.

In order to achieve a good scanning quality, an optimum illumination of the masters is required, particularly given employment of scanner drums having different diameters. For optimum setting of the size of the illumination spot on the respective master, lens systems must be manually replaced at the feed support given a traditional drum scanner in order to compensate the different radial distances between the central arm of the feed support and the generated surface of the respective scanner drum, this being relatively complicated.

SUMMARY OF THE INVENTION

It is therefore an object of the invention to improve a method and an apparatus for pixel-by-pixel and line-by-line, opto-electronic scanning of masters chucked on scanner drums such that an optimum pixel-by-pixel illumination of the masters is achieved in a simple way and automatically to the farthest-reaching extent, particularly given employment of scanner drums having different diameters.

According to the method of the present invention for point-by-point and line-by-line, opto-electronic scanning of a master, the master is chucked on a scanner drum. A light spot is generated for pixel-by-pixel illumination of the master, the light spot being imaged onto the master as an illumination spot. The scan light is modulated with a content of the master, is focused with a scanner objective, and is converted into an image signal in an opto-electronic scanner element. A feed motion is executed with the illumination spot, scanner objective, and scanner element in a direction of the rotational axis of the scanner drum for scanning of the master. Illuminance of the illumination spot is measured. The illumination of the master is set dependent on the measured luminance by modifying an imaging scale with which the light spot is imaged onto the master as the illumination spot.

The invention is explained in greater detail below with reference to FIGS. 1 through 3.

DESCRIPTION OF THE PREFERRED EMBODIMENTS

Figure 1:
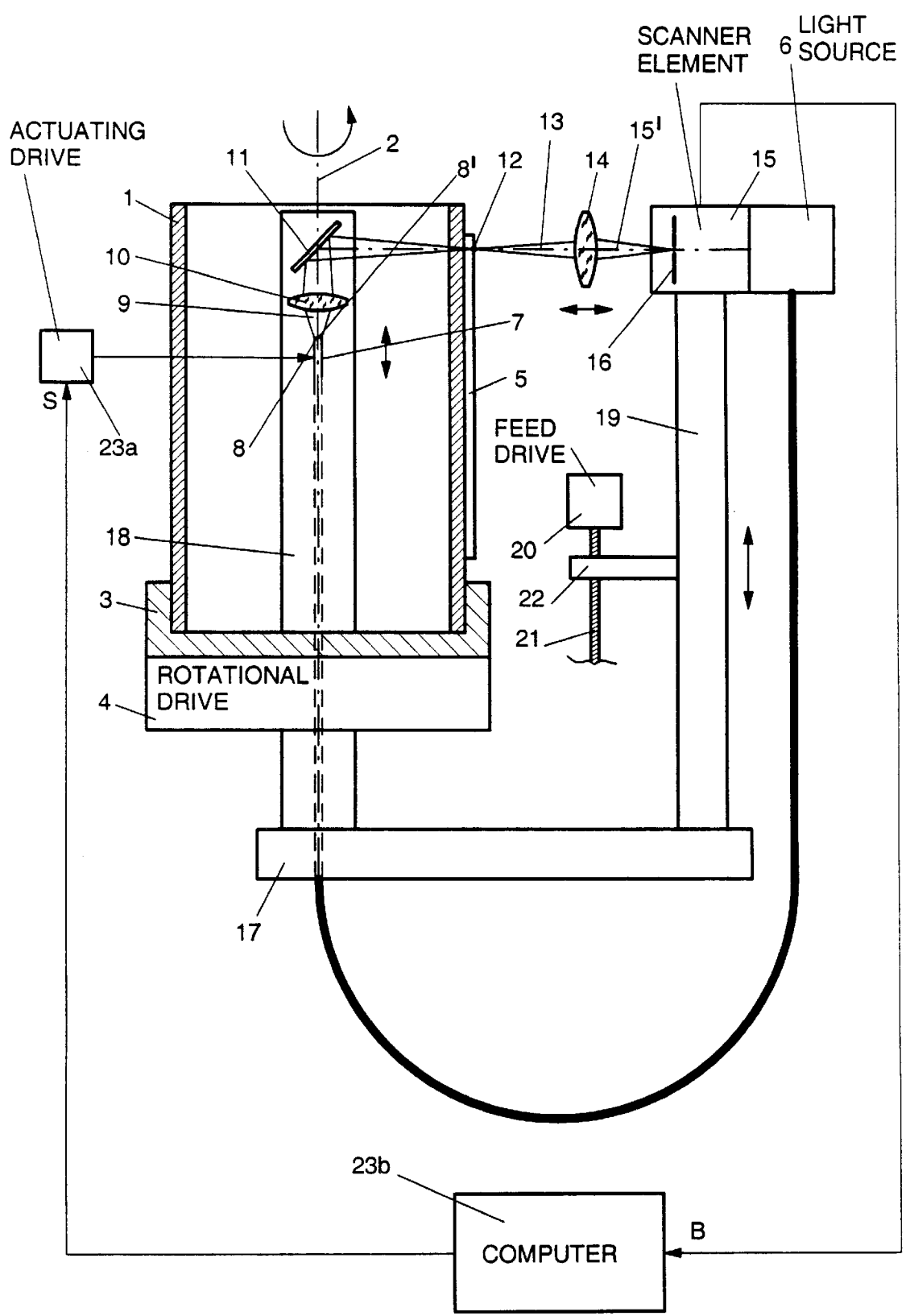
FIG. 1 shows the fundamental structure of a drum scanner.

FIG. 1 shows the fundamental structure of a drum scanner. A transparent scanner drum 1 having, for example, a vertical rotational axis 2, is coupled to a rotational drive 4 with a clamp mechanism 3. The rotational axis 2 of the scanner drum 1 can also be horizontally arranged or arranged at an arbitrary angle relative to the floor space of the drum scanner.

A transparency master 5 is mounted on the scanner drum 1. For scanning transparency masters 5 with different formats, scanner drums 1 having different diameters are chucked in the drum scanner with the assistance of the clamp mechanism 3. The clamp mechanism 3 is constructed, for example, according to German Utility Model 296 23 523 and the rotational drive is constructed according to German Published Application 196 01 524.

For pixel-by-pixel illumination of the transparency master 5, an illumination unit 7, 8, 10, 11 is provided in the hollow-cylindrical interior of the scanner drum 1, this illumination unit being supplied by a light source 6 located outside the scanner drum 1. A light beam generated by the light source 6 is transported through a light conductor 7 into the illumination unit and emerges through a light exit face 8 of the light conductor 7 in the direction of the rotational axis 2. The light beam 9 that has emerged is deflected in radial direction onto the transparency master 5 with a matching objective 10 in the rotational axis 2 and a deflection mirror 11 arranged at 45° relative to the rotational axis 2, as a result whereof a light spot 8' in the light exit face 8 of the light conductor 7 is imaged onto the transparency master 5 as an illumination spot 12.

The scan light 13 that the transparency master 5 allows to pass and that is modulated with the luminance values of the scanned picture elements proceeds through a scanner objective 14 into a scanner element 15 located Outside the scanner drum 1 that has a scanner diaphragm 16 and an optoelectronic transducer not shown, whereby the illumination spot 12 and scanner objective 14 lie on the optical axis 15' of the scanner element 15 that proceeds radially relative to the scanner drum 1.

In the scanner element 15, the scan light 13 is converted with the opto-electronic transducer into an image signal B for further-processing. Scanner element 15 and light source 6 are structurally united in the illustrated exemplary embodiment. Scanner objective 14, scanner element 15 and light source 6 move axially along the rotating scanner drum 1 for planar scanning of the master.

So that the illumination spot 12 in the planar scanning of the original always lies in the optical axis 15' of the scanner element 15, at least the deflection mirror 11—the illumination unit with light conductor 7, matching objective 10 and deflection mirror 11 in the exemplary embodiment—must be entrained in the axial direction synchronously with the scanner objective 14 and the scanner element 15. For that purpose, a U-shaped feed support 17 is present with an inner arm 18 and an outer arm 19, this being moved during the scanning of the original in the axial direction of the scanner drum 1 by a feed drive 20 with the assistance of a spindle 21 and a nut segment 22 located at the feed support 17. The inner arm 18 of the feed support 17 is guided by the rotational drive 4, projects into the scanner drum 1 at the end face, and extends along the rotational axis 2. The inner arm 18 carries the illumination unit 7, 8, 10, 11. The outer arm 19 of the feed support 17 proceeding parallel to the inner arm carries the scanner objective 14, the scanner element 15 and the light source 6.

For scanning opaque masters, a reflected light illumination not shown in FIG. 1 is present that generates a corresponding illumination spot 12 on the opaque master. In this case, the modulated scan light 13 reflected from the opaque master to be scanned is converted into an image signal B in the scanner element 15.

When scanner drums 1, 1' having different diameters are chucked in the drum scanner, the distance between the deflection mirror 11 and the transparency master 5 mounted on the scanner drum 1 as well as the distance between the transparency master 5 and the scanner diaphragm 16 in the scanner element 15 change. In this case, the size of the illumination spot 12 on the transparency master 5 and the focusing of the scan light 13 coming from the transparency master 5 onto the scanner diaphragm 16 must be corrected.

The size correction of the illumination spot 12 on the transparency master 5 given employment of scanner drums 1, 1' having different diameters advantageously occurs with an automatic change of the imaging scale with which the light spot 8' of the light exit face 8 of the light conductor 7 is imaged on the transparency master 5 as the illumination spot 12. The modification of the imaging scale is achieved by modifying the distance between the light exit face 8 of the light conductor 7 and the matching objective 10 stationarily secured to the inner arm 18. Preferably, the light conductor 7 on the inner arm 18 is shifted in the direction of the rotational axis 2 of the scan drums 1 into axial working positions $A_k$ and $A_g$ with an actuating drive 23a, these working positions being prescribed by the diameter of the respectively employed scanner drum 1, 1'.

The recorrection of the focusing of the scan light 13 onto the scanner diaphragm 16 in the scanner element 15 occurs by modifying the radial distance between the generated surface of the respective scanner drum 1, 1' and the scanner objective 14 by shifting the scanner objective 14 into radial working positions $B_k$ and $B_g$ that are prescribed by the diameter of the respectively employed scanner drums 1, 1'.

The optimum pixel-by-pixel illumination of the masters to be respectively scanned, particularly given employment of scanner drums having different diameters, is inventively achieved in that the size of the illumination spot 12 on the master 5 to be scanned is modified by displacing the light exit face 8 of the light conductor 7 with the actuating drive 23a and the luminance in the illumination spot 12 is continuously measured with the scanner element 15, whereby the image signal B is a criterion for the luminance in the illumination spot 12, whereby fluctuations of the thickness of masters 5 to be scanned or of the diameter of the scanner drums 1, 1' employed are to be taken into consideration.

In a preferred way, the determination of the optimum illumination occurs via an automatic control. The actuating drive 23a displaces the light conductor 7 step-by-step. At every step, the luminance of the illumination spot 12 is measured with the scanner element 15, and the image signal B is supplied to a computer 23b. In the computer 23b, the functional relationship between the measured luminance values and the plurality of displacement steps of the light conductor 7 is registered. The optimum illumination is achieved when the size of the illumination spot 12 is a minimum and the measured luminance in the illumination spot 12 is a maximum. On the basis of the registered function, the plurality of displacement steps belonging to the maximum luminance value is identified and communicated as control signal S to the actuating drive 23a for corresponding displacement of the light conductor 7.

As a result of the controlled displacement of the light conductor 7, both the size of the illumination spot 12 as well as the optimum illumination given employment of scanner drums 1, 1' having different diameters are set in a preferred way. It lies within the scope of the invention to also employ the controlled displacement of the light conductor 7 for illumination matching given employment of a scanner drum having a fixed diameter and When scanning transparency and opaque masters.

Figure 2:
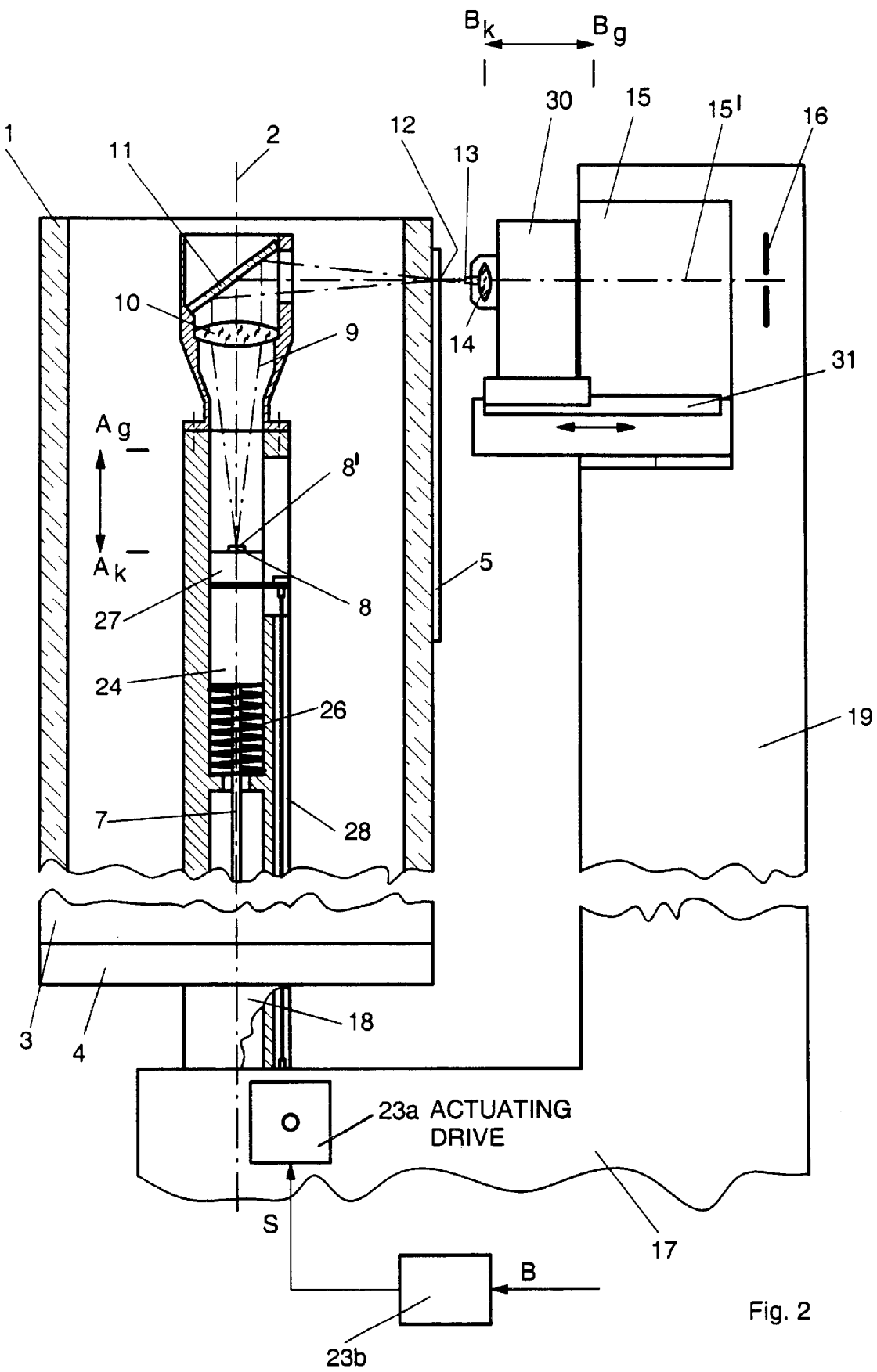
FIG. 2 is an exemplary embodiment of the devices for axial, displacement of a light conductor and for radial displacement of a scanner objective, as well as the positioning of the light conductor and of the scanner objective given employment of a scanner drum having a small diameter.

FIG. 2 shows an exemplary embodiment of the devices for the axial displacement of the light conductor 7 at the inner arm 18 and for the radial displacement of the scanner objective 14 at the outer arm 19 of the feed support 17, as well as the positioning of the light conductor and of the scanner objective given employment of a scanner drum 1 having a small diameter.

The end region of the light conductor 7 with the light exit face 8 is enveloped by a cylindrical light conductor mount 24 that is seated in sliding fashion in the hollow-cylindrical inner arm 18 of the feed support 17. A compression spring 26 is arranged between a recess 25 at the inside wall of the inner arm 18 and the light conductor mount 24. A radial finger 27 is attached to the light conductor mount 24, said finger being connected to the controllable actuating drive 23a via a traction cable 28 proceeding in the direction of the inner arm 18. The actuating drive 23a is, for example, a stepping motor that drives a cable drum. The actuating drive 23a is preferably attached to the feed support 17. With the controllable actuating drive 23a and the traction cable 28, the light conductor mount 24 and, thus, the light exit face 8 of the light conductor 7 is automatically displaced against the force of the compression spring 26 into one of the two axial working positions $A_k$ or $A_g$ according to the diameter of the scanner drum 1, 1' used at the moment—into the axial working position $A_k$ for the scanner drum 1 having a small diameter in the illustrated example—and it is fixed thereat.

The scanner objective 14 is mounted on an objective holder 30 that is displaced with an actuating drive not shown with guides 31 onto one of the two radial working positions $B_k$ or $B_g$ corresponding to the diameter of the scanner drum 1, 1' used at the moment—into the radial working position $B_k$ for the scanner drum 1 having a small diameter in the illustrated example—and is fixed thereat.

Figure 3:
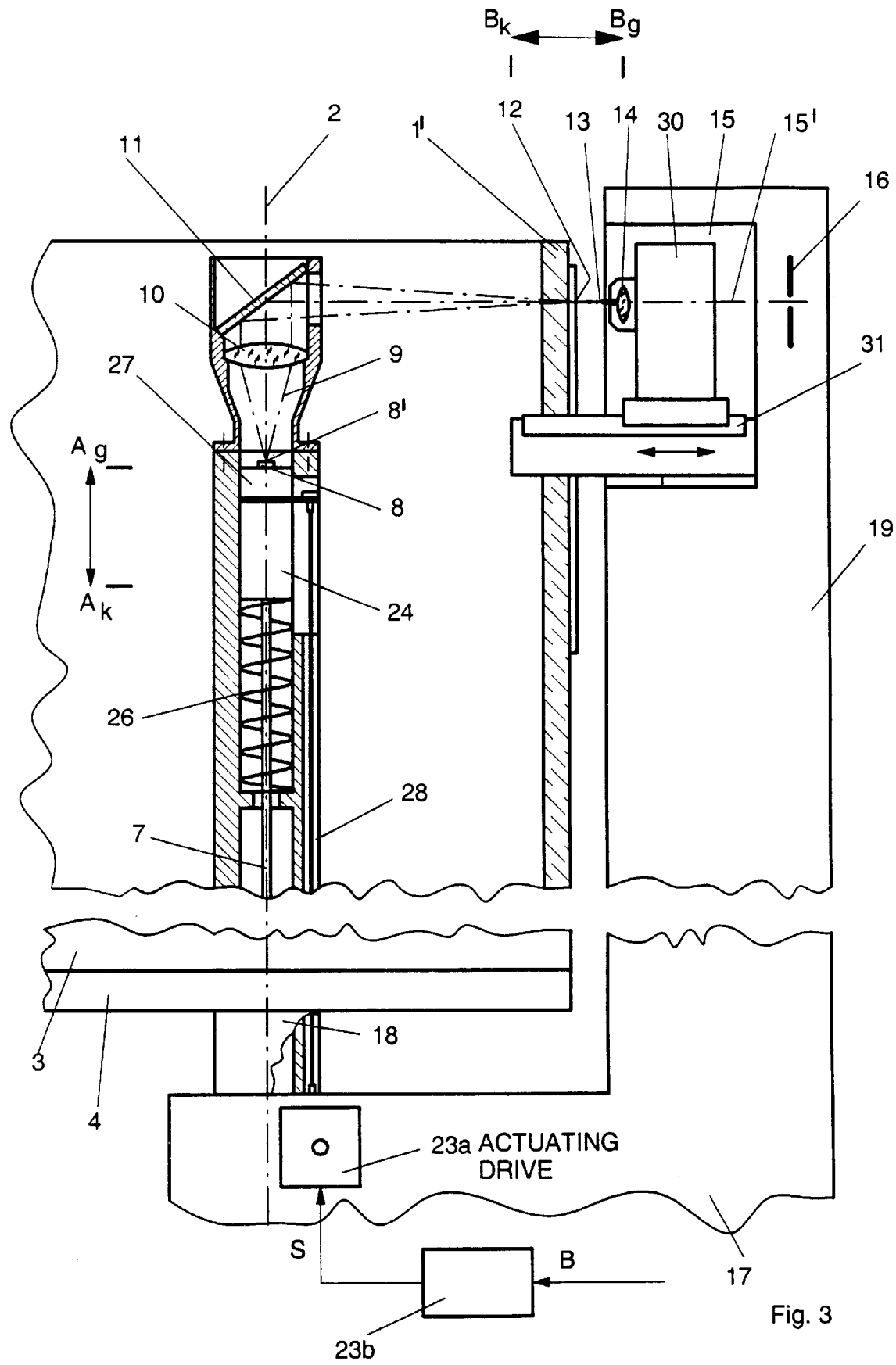
FIG. 3 shows the positioning of the light conductor and of the scanner objective given employment of a scanner drum having a large diameter.

FIG. 3 shows the positioning of the light conductor 7 and of the scanner objective 14 given employment of a scanner drum 1' having a large diameter. In this case, the exit face 8 of the light conductor 7 is displaced into the axial working position $A_g$, and the objective holder 30 with the scanner objective 14 is displaced into the radial working position $B_g$.

It can be seen from FIGS. 2 and 3 that an optimum size of the illumination spot 12 and an optimum focusing of the scan light 13 onto the scanner element 15 are respectively achieved in an advantageous way given different diameters of the scanner drums 1, 1'.

Although various minor modifications might be suggested by those skilled in the art, it should be understood that our wish to embody within the scope of the patent warranted hereon all such modifications as reasonably and properly come with the scope of our contribution to the art.

We claim as our invention:

1. A method for point-by-point and line-by-line, opto-electronic scanning of a master, comprising the steps of:
   chucking the master on a scanner drum;
   generating a light spot for pixel-by-pixel illumination of the master and imaging it onto the master as an illumination spot;
   modulating the scan light with a content of the master, focusing with a scanner objective, and converting it into an image signal in an opto-electronic scanner element;
   executing a feed motion with the illumination spot, scanner objective and scanner element in a direction of a rotational axis of the scanner drum for scanning of the master;
   measuring luminance of the illumination spot; and
   setting the illumination of the master dependent on the measured luminance by modifying an imaging scale with which the light spot is imaged onto the master as the illumination spot.

2. The method according to claim 1 wherein the imaging scale is modified for setting an optimum illumination of the master such that the measured luminance of the illumination spot is maximum.

3. The method according to claim 1 wherein the luminance of the illumination spot is measured with the opto-electronic scanner element.

4. The method according to claim 1 wherein:
   the light spot is generated at a light exit window of a light conductor;
   the light spot is imaged onto the master as the illumination spot with a matching objective; and
   the imaging scale of the illumination spot is modified by displacing the light conductor relative to the matching objective.

5. The method according to claim 4 wherein:
   the measured luminance values are converted into control signals for an actuating drive; and
   the actuating drive effects a displacement of the light conductor.

6. The method according to claim 4 wherein:
   the light conductor is displaced step-by-step;
   the respective luminance of the illumination spot is measured after every step;
   a relationship between the measured luminance value and the respective plurality of displacement steps of the light conductor is determined as a function;
   a plurality of displacement steps belonging to the maximum luminance is identified on the basis of the function; and
   the light conductor executes the identified plurality of displacement steps for an optimum illumination setting.

7. The method according to claim 4 wherein:
   scanner drums having different diameters are employed;
   the light conductor is displaced in the direction of the rotational axis of the scanner drums into an axial working position determined by the diameter of the respective scanner drum; and
   the imaging of the light spot onto the respective scanner drum as the illumination spot occurs with a deflection mirror.

8. The method according to claim 7 wherein a focusing of the scan light onto the scanner element given employment of scanner drums having differing diameters is corrected by displacing the scanner objective in the direction of the optical axis of the scanner element into a radial working position determined by the diameter of the respective scanner drums.

9. The method according to claim 1 wherein:
   scanner drums are designed transparent for scanning transparency masters;
   the light spot is generated within the respective scanner drum; and
   the scanning of the transparency master occurs with the scanner element arranged outside the respective scanner drum.

10. An apparatus for point-by-point and line-by-line, opto-electronic scanning of a master, comprising:
    a scanner drum for chucking a master to be scanned;
    an illumination unit for generating an illumination spot with a scan light on the master by imaging a light spot onto the master;
    a scanner objective;
    a scanner element for converting the scan light modulated with a content of the master and focused with the scanner objective into an image signal; and
    a feed support at which the illumination unit for generating the light spot, the scanner objective and the scanner element are arranged, the feed support executing a feed motion in a direction of the rotational axis of the scanner drum for scanning of the master;
    the illumination unit is designed such that a size of the illumination spot is variable via an imaging scale of the illumination spot;
    a measuring unit for measuring a luminance of the illumination spot; and
    a modifying structure connected to the measuring unit and to the illumination unit for modifying the imaging scale of the illumination spot dependent on the measured luminance.

11. The apparatus according to claim 10 wherein the scanner element is employed as the measuring unit.

12. The apparatus according to claim 10 wherein:
    the scanner drum is transparent for scanning transparency masters;

the feed support is displaceable in the direction of the rotational axis of the scanner drum and has first and second arms proceeding parallel to the rotational axis, whereof the first arm projects centrally into the scanner drum from an end face;

the second arm carries the scanner objective and the scanner element, and the first arm carries the illumination unit for generating the illumination spot;

the illumination unit is composed of a matching objective lying on the rotational axis, of a deflection mirror oriented transversely relative to the rotational axis, and of a light conductor having a light exit face;

at least one sub-section of the light conductor in a region of the light exit face at the first arm carrying the illumination unit is seated displaceable in the direction of the rotational axis relative to a a matching objective with a displacement unit;

the displacement unit is connected to an actuating drive; and a stage connected to the measuring unit and to the actuating drive, said stage converting the measured luminance into control signals for the actuating drive.

13. The apparatus according to claim 10 wherein:

scanner drums having different diameters are employed; and the displacement unit connected to the actuating drive displaces the light conductor onto axial working positions predetermined by the diameter of the respectively employed scanner drums for modifying the imaging scale of the illumination spot.

14. The apparatus according to claims 10 wherein an actuating drive is attached to the feed support.

15. The apparatus according to claim 12 wherein:

an end region of the light conductor at the light exit face is enveloped by a cylindrical light conductor mount;

at least the first arm of the feed support carrying the light conductor is designed hollow-cylindrically in regions;

the light conductor mount is seated in sliding fashion in the hollow-cylindrical interior of the arm; and the light conductor mount is connected via the displacement unit to the actuating drive, as a result whereof the light conductor is displaceable into axial working positions.

16. The apparatus according to claims 13 wherein the first arm of the feed support carrying the illumination unit projects into the respective scanner drum at the end face as an inner arm.

17. The apparatus according to claims 12 wherein:

the respective scanner drum is chucked into the apparatus with a clamp mechanism;

the clamp mechanism is rotationally driven by a rotational drive; and the inner first arm of the feed support is guided into the scanner drum by a rotational drive and the clamp mechanism.

18. The apparatus according to claim 12 wherein the illumination unit is supplied via the light conductor from a light source located at the feed support.

19. The apparatus according to claim 10 wherein:

the scanner objective is mounted on an objective holder that is displaceably seated in the direction of the optical axis; and the objective holder with the scanner objective is displaceable into a radial working position defined by a diameter of the respective scanner drum for correction of focusing of the scan light onto the scanner element given employment of scanner drums having different diameters.

20. The apparatus according to claim 19 wherein the objective holder is displaceable with an actuating drive.

21. The apparatus according to claim 10 wherein the rotational axis of the respective scanner drum is vertically aligned relative to the floor space of the scanner element.

22. A method for scanning of a master, comprising the steps of:

mounting the master on a scanner drum;

generating a light spot with a scan light for point-by-point illumination of the master and imaging it onto the master as an illumination spot;

modulating the scan light with a content of the master, and converting it into an image signal in an opto-electronic scanner element;

executing a feed motion with the illumination spot and scanner element in a direction of the rotational axis of the scanner drum for scanning of the master;

measuring luminance of the illumination spot; and setting the illumination of the master dependent on the measured luminance by modifying an imaging scale with which the light spot is imaged onto the master as the illumination spot.

* * * * *